Jan. 30, 1951  F. C. I. MARCHANT ET AL  2,539,960
MOUNTING STRUCTURE FOR GAS-TURBINE
POWER PLANTS FOR AIRCRAFT
Filed July 17, 1947  2 Sheets-Sheet 1
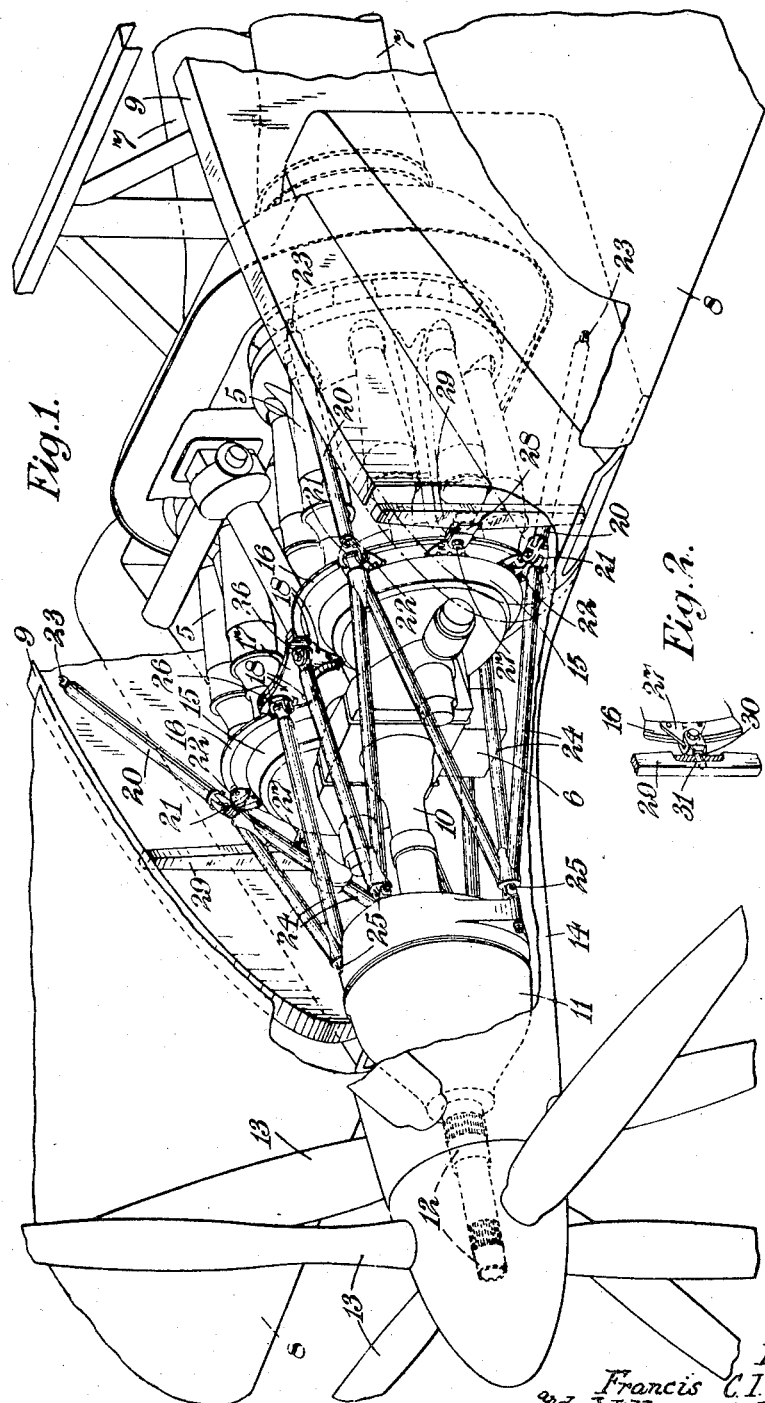
Inventors
Francis C. I. Marchant
and William G. Morgan
by Wilkinson & Mawhinney
Attorneys

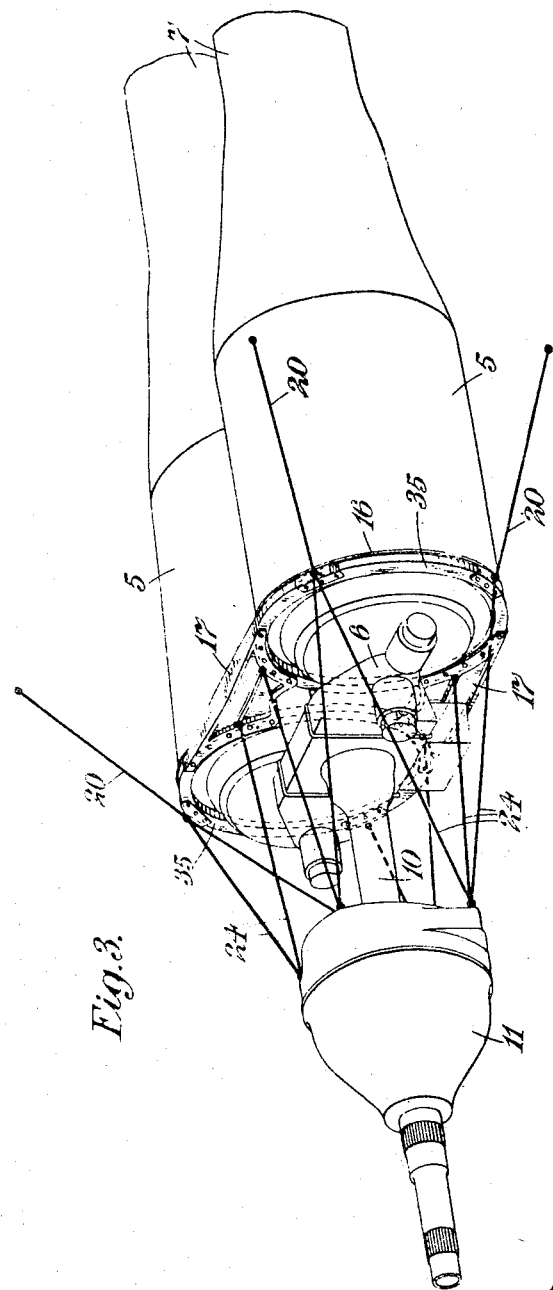

Patented Jan. 30, 1951

2,539,960

UNITED STATES PATENT OFFICE 2,539,960

MOUNTING STRUCTURE FOR GAS-TURBINE POWER PLANTS FOR AIRCRAFT

Francis Charles Ivor Marchant and William George Morgan, Bristol, England, assignors to The Bristol Aeroplane Company Limited, Bristol, England, a British company Application July 17, 1947, Serial No. 761,678
In Great Britain May 22, 1946

3 Claims. (Cl. 60—102)

This invention concerns mountings for gas-turbine power plants for aircraft of the kind comprising a pair of engines and a common gear box which constitutes a structural member joining the engines together.

The invention has for its object to provide a mounting which allows one engine to expand and contract lengthwise and transversely (or radially) independently of the other and also allows the power plant as a whole to expand and contract relatively to the aircraft structure which carries it.

According to this invention a gas-turbine power plant of the kind set forth has the engines supported from the aircraft by a plurality of rods, one end of each of which is hinged to an engine and the other end of which is hinged to the aircraft structure, the engine-attachment end of the rods lying in a common plane transverse of the engines.

According to a feature of the invention each engine carries a mounting ring to which the rods are hinged, said rings both lying in said transverse plane and having a coefficient of thermal expansion similar to the engine parts by which they are carried.

Preferably the transverse plane is disposed near the gear-box structure and there is provided in said plane a bridge-piece joining either the two engines or the two mounting rings said piece having a coefficient of thermal expansion similar to that of the gear-box structure.

A practical application of the invention will now be described, by way of example only, with reference to the accompanying drawings of which:

Figure 1 is a perspective view of a gas turbine power plant mounted in the wing of an aeroplane in accordance with this invention, Figure 2 is a perspective view to an enlarged scale showing a detail of the mounting of Figure 1, and Figure 3 is a diagrammatic perspective view of an alternative construction of mounting for the power plant of Figure 1.

The mounting shown in Figures 1 and 3 is used with the same construction of power plant—which is more fully illustrated in Figure 1—and the power plant will therefore be described with reference to the latter figure.

The power plant comprises a pair of gas-turbine engines, which are indicated by the numeral 5, and a gear box 6 into which an output shaft (not shown) of each engine extends. The exhaust gases from each turbine engine pass along a jet pipe 7 to the trailing-edge of the wing 8 and are ejected to assist in propulsion. The power plant is buried in the wing 8 and lies between a pair of ribs 9 of the wing.

The engines 5 lie side-by-side and the gear box 6 is constituted as a single casting which extends from one engine 5 to another, being bolted to an end face of each to secure the engines together. The gears in the gear box 6 drive a shaft 10 which lies parallel with the long axes of engines 5 and extends from the box towards the leading-edge of wing 8. The shaft 10 enters a casing 11 containing reduction gearing which transmits the drive in opposite directions to the shafts 12 of airscrews 13. The casing 11 is in part disposed within a monocoque housing 14. This power plant is supported in the wing of the aeroplane either by the mounting shown in Figure 1 or by the mounting shown in Figure 3.

Referring again to Figure 1: each engine 5 is provided with a compressor the casing of which is indicated at 15: the casing is formed with a peripheral flange 16 and the upper part of one casing is joined to the other by a bridge-piece 17. The latter is suitably shaped to conform to the casings and has side faces between which the flanges 16 lie. The bridge-piece 17 may be formed in two parts which are secured together, when the piece is assembled in position, by the attachment bolts 18. The bridge-piece 17 is of a metal having a similar coefficient of thermal expansion to the casing 6. A second bridge-piece (not shown) is provided to join the lower parts of the casings 16.

The power plant described above is supported within the wing 8 by a structure which comprises a plurality of rods 20 each of which is hinged at 21 to a bracket 22 which is attached to the casing 15. The other end of each rod 20 is attached to a rib 9 by a hinge member of which only the rod element is shown, at 23. The points of attachment 21 all lie in a common plane disposed transversely of the engines 5 so that the latter are carried cantileverwise within the wing: the transverse plane is near to the casing 6.

The casing 11 is supported from the engines 5 by a pair of braced structures each of which comprises a plurality of rods 24. The latter are all attached to the casing 11, as at 25, and either to a point of attachment 21 or to a bridge-piece 17 as at 26. The structures supporting casing 11 also carry the airscrew assemblage and support the forward end of shaft 10. The rods 24 which extend between casing 11 and a bridge-piece 17 contribute to the lateral stiffness of said bridge-piece.

At the outer side of one engine there is a bracket 27 which carries a stirrup 28 between the flanges of which lies a pillar 29, the latter being attached to a rib 9. There is a clearance in the radial or transverse direction between the member 28 and its pillar 29 thereby allowing for thermal expansions of the engines. The other engine also carries a similarly disposed bracket 27 which is formed with a pin 30 instead of a stirrup 28. The pin enters a hole 31 in the associated pillar 29 thereby locating the engines in all directions except radially, i. e., lengthwise of the pin which allows of thermal expansions transversely of the engines to take place.

With the mounting described each engine 5 is individually capable of movements of expansion in the transverse (or radial) and longitudinal directions as it is supported cantileverwise at a single transverse plane. The bridge-pieces 17 provide rigidity to the connection between the engines and relieve the gear box 6 of a part of the loads which, in use, are transmitted from one engine to the other. The operating temperatures in a gas turbine are sufficiently high to produce considerable radial displacements between the long axes of the engines but as the material of the pieces 17 has been selected to have similar expansion properties as the gear box 6 these movements will not produce undesirable thermal stresses: the pieces 17 are very nearly at the same temperature as the gear box being near to it. Transverse movements of expansion of the power plant as a whole are catered for by the hinge attachments 21.

As has been indicated above the power plant described with reference to Figure 1 may be supported in the wing of the aeroplane by the structure shown in Figure 3. Referring to this figure the flange 16 of each engine 5 has bolted to it at several spaced points a mounting ring 35 of box section. The ring is of a material having similar thermal expansion properties as the compressor casing of the engine to which it is attached. The rings 35 have themselves little lateral stiffness but this is imparted to them by the compressor casing when they are bolted thereto.

The upper and lower portions of the mounting rings are joined together by a bridge-piece 17. The material of the latter has a similar coefficient of thermal expansion as the material of the gear box 6. The rods 20 are hinged to the mounting rings 35 as in the manner described above with reference to Figure 1 where the rods were attached directly to the flanges 16, i. e., without the intermediary of the mounting rings. The casing 11 is also supported from the bridge-piece 17 and the rings 35 as described with reference to Figure 1. Finally, the rings 35 are also supported by pillars 29 (not shown in Figure 3) as already set forth.

We claim:

1. A vehicle power plant comprising a pair of gas-turbine engines spaced apart and lying side by side, a gear-box extending from one engine to the other and connected to each engine the engines driving a power-output shaft through said gear-box, a bridge-piece extending from one engine to the other near the gear-box and rigidly secured to each engine so as partly to relieve the gear-box of loads transmitted from one engine to the other, a plurality of rods spaced around the engines and extending generally lengthwise of the engines, means for attaching one end of each rod to the vehicle and hinge means for attaching the end of each rod individually to one of the engines, the hinge axes of said hinge means all being in a common plane lying transversely of the engines so that the power plant is supported cantileverwise by said rods from the vehicle.

2. A power plant as claimed in claim 1 in which said hinge means attaches one end of each rod to a mounting ring, one of which is provided for each engine, said rings being rigidly secured to the engines to lie in said common transverse plane and having a coefficient of expansion similar to the engine part to which each is attached.

3. A power plant as claimed in claim 2 wherein a bridge-piece is provided on each side of the gear-box, each bridge-piece being rigidly secured to the mounting rings and having a coefficient of expansion similar to the material of the gear-box.

FRANCIS CHARLES IVOR MARCHANT.
WILLIAM GEORGE MORGAN.

REFERENCES CITED

The following references are of record in the file of this patent:

UNITED STATES PATENTS

| Number | Name | Date |
|---|---|---|
| 1,804,312 | Brown | May 5, 1931 |
| 2,160,281 | Price | May 30, 1939 |
| 2,284,473 | Menasco et al. | May 26, 1942 |
| 2,411,227 | Planiol et al. | Nov. 19, 1946 |
| 2,423,183 | Forsyth | July 1, 1947 |
| 2,427,846 | Forsyth | Sept. 23, 1947 |